FLUID METERING AND DISPENSING APPARATUS

GAS BURETTE CALIBRATION CURVE
(A TYPICAL STANDARD CALIBRATION CURVE OBTAINED WITH THE FLUID METERING AND DISPENSING APPARATUS USING ONE OF THE INTERCHANGEABLE GAS BURETTES.)

United States Patent Office 3,387,635
Patented June 11, 1968

3,387,635
FLUID METERING AND DISPENSING APPARATUS
Robert I. Papendick, Florence, and James F. Parr, Jr., Killen, Ala., assignors to Tennessee Valley Authority, a corporation
Filed Apr. 28, 1965, Ser. No. 451,672
1 Claim. (Cl. 141—37)

ABSTRACT OF THE DISCLOSURE

Apparatus for rapidly and accurately metering and dispensing predetermined quantities of compressed gases or pressure solutions into closed receiving systems with good precision based on a positive displacement principle in which a compressed gas, such as ammonia from a supply cylinder, displaces the retaining liquid, in this case metallic mercury, contained in one of a number of interchangeable gas burettes. The mercury is displaced into a reservoir by the incoming gas and is also simultaneously displaced into a manometer arm connected in parallel with the reservoir. As the mercury level in the gas burette approaches the desired setting, the incoming gas is subjected to increased pneumatic impedance by forcing it through a by-pass assembly which provides a sensitive means to control the flow rate and thereby attain the desired setting. Suitable valves are arranged in the glass conduit lines leading to the gas burette so as to subsequently dispense the gas sample from the burette into a closed system or reaction chamber. The gas sample is forced from the burette by the pressure exerted by the adjacent mercury column. The exact quantity of gas that is metered may be determined in one of two ways: (1) from an empirical relationship between the height of the mercury column in the gas burette and the quantity of gas as determined by chemical analysis, or (2) by direct application of the equation of state.

---

The invention herein described may be manufactured and used by or for the Government for governmental purposes without the payment to us of any royalty therefor.

Our invention relates to a method and apparatus for rapidly and accurately metering and dispensing compressed gases or pressure solutions into closed chambers, and more particularly to a method and apparatus for rapidly and accurately supplying a relatively large number of gas samples wherein the reproducibility between gas samples of like volume is extremely accurate, and still more particularly to a method and apparatus for metering and dispensing samples of the type described wherein the volume to be dispensed, although of relatively minute quantity, may be accurately predetermined over a relatively broad range.

Heretofore it has been the practice in industry to use various known methods and types of apparatus to meter and dispense compressed gases. Generally these methods either employ flowmeter or positive displacement type techniques. The flowmeter techniques appear to be most easily adapted to systems wherein relatively large volumes of gas are continuously metered and dispensed, whereas the positive displacement type technique is more generally adaptable to systems wherein the dispensing is either intermittent or intended to supply relatively small volumes of gas to a system. Such positive displacement techniques, in the past, have employed apparatus wherein the gas to be dispensed may itself be utilized to expand a bellows or to displace a piston or confining liquid. Obviously, in the employment of either or both of these types of methods, the materials of construction for the turbine blades, pistons, and confining media must be such that they are nonreactive with the gas to be dispensed, and further, in the case of a bellows arrangement or confining liquid, it is essential that the gas to be dispensed is not permeable therethrough.

In the area of metering and dispensing relatively small volumes of gases exhibiting characteristics of high chemical reactivity such as, for example, in dispensing predetermined quantities of gaseous ammonia into laboratory or greenhouse soil systems, it has been the practice to design injector apparatus based upon a positive displacement principle. In apparatus of this type, the medium which has been selected to trap and also to be displaced by the gas frequently is mercury. There are, of course, many reasons why apparatus of this type are selected for metering and dispensing relatively small volumes of highly reactive gases into closed systems, some of the most obvious of which are as follows: Although the use of standard flowmeter techniques are often employed to meter and dispense compressed gases, their accuracy and precision are greatly limited when small volumes of gas are involved. On the other hand, positive displacement apparatus which employ the use of pistons, bellows, and the like, although inherently more accurate than the flowmeter technique in the handling of small volumes of gas, exhibit substantial corrosion problems and, in the case of bellows apparatus, problems are encountered in permeability of the bellows material, whereas, on the other hand, when liquid mercury is the medium to be displaced, the problems of gas permeability and corrosion are substantially reduced. Even with the advent of more highly chemically resistant materials of construction and coating compositions, the piston positive displacement apparatus of the prior art are still found to be lacking in that apparatus of this type still presents substantial problems in maintaining gas-tight seals during repeated operation of the injection apparatus, coupled with the relatively high expense involved in the construction thereof, as opposed to various arrangements of mercury traps, valves, and columns in relatively simple laboratory glass apparatus.

One example in the prior art in which glassware apparatus is designed to accommodate or to be filled with mercury is found in U.S. Patent 2,501,461 to H.E. Worth, Mar. 21, 1950, wherein there is provided a simple valve for permitting the passage of gases or fluid through a conduit in one direction only. In a still earlier issued patent to J. B. Johnson, U.S. 1,507,919, Sept. 9, 1924, there is disclosed an apparatus and method utilizing laboratory glassware and mercury for admitting relatively small measured quantities of gas into an evacuated system without appreciably reducing the purity of the gas. Although the Johnson patent may be operable in its objective to admit numerous relatively small but measured gas volumes from a reservoir into a closed evacuated system, the method and apparatus disclosed therein, along with other methods and apparatus in the prior art, have not, in most instances, provided the necessary means of rapidly metering and dispensing compressed gases into closed systems with a good degree of precision.

Such prior-art methods and apparatus, including the Johnson apparatus, have a number of inherent limitations, some of which are:

(1) They do not provide a means for the complete removal of all foreign gases prior to the introduction of the gas sample. In Johnson, for example, in order to purge contaminated gases in the conduit, trap, chamber, and connections thereto, from the gas reservoir prior to introduction of the sample into the capillary tube, it would be necessary to achieve a perfect vacuum which in itself is a physical impossibility. Even for more practical purposes where a "near" vacuum might be applicable, a considerable period of time and expensive instrumentation would be necessary.

(2) The provision in the apparatus of the prior art for admitting gas from the supply reservoir into the system is often times extremely awkward and would be highly impractical when a large number of individual gas samples are sought to be transferred to closed systems. Again in Johnson, for example, in order to dispense a large number of samples, the operator would continuously have to adjust the total gas pressure in the admitting side of the apparatus prior to metering a gas sample. However, the Johnson apparatus makes no such provision for such a pressure adjustment. Further, in the prior art, the gas reservoir is connected and disconnected repeatedly by means of a glass seal which must be broken during each operation. In the Johnson apparatus, it would be most inconvenient to meter and dispense successive gas samples of exactly equal volume without either (a) connecting and disconnecting the gas reservoir, or (b) referring to a series of different calibration curves.

(3) The metering portion of such prior-art apparatus is either constructed of such dimensions as to ensure rapid metering therein and thus to restrict the relative precision or accuracy of the apparatus, or on the other hand, of such small dimension, i.e., through the use of capillary tubes, to rely upon the surface tension of mercury for providing in itself the trapping mechanism, with the result that the volume of any single gas sample which can be handled is necessarily greatly limited. Again in Johnson, the chamber into which the gas sample is admitted for volume measurements is by necessity a tube of small diameter, i.e., a capillary tube. Therefore, the size of the gas sample is also inherently minute. In order to overcome the serious disadvantage of volume restriction of any one sample which can be handled by Johnson, the diameter of the metering tube would obviously need to be increased. However, in such an event, it would also obviously be impossible to contain the gas sample by the method described therein.

We have overcome the difficulties inherent in the method and apparatus of the type of the prior art to a substantial extent in the present invention. Our apparatus, for example, does not employ a vacuum system to remove foreign gases from the glass conduit of our metering system, but rather accomplishes this much more effectively and completely by providing for the flushing of the entire metering system with the type of gas which is to be subsequently metered prior to admitting a predetermined volume of the gas into a gas burette. Furthermore, our apparatus has been found to be highly satisfactory for metering and dispensing a large number of gas samples rapidly and with extremely fine precision. In actual practice, for example, our method and apparatus has required less than two minutes to meter and dispense accurately and with precision of great reproducibility samples in the range from 50 to 800 milligrams of ammonia nitrogen into a single reaction chamber. In our method and apparatus, smaller quantities of gas, of course, can be metered and dispensed even more rapidly.

We have discovered a method and means to accomplish our desired result which comprises displacing a retaining liquid such as metallic mercury contained in a gas burette by the gaseous medium to be metered, which gaseous medium is supplied from the desired source. In our apparatus, the mercury is displaced into a mercury reservoir by the gaseous medium and is also simultaneously displaced into a manometer tube connected in parallel with the mercury reservoir. In our apparatus, a bypass means is installed in a line between the gaseous medium supply source and the gas burette to facilitate bringing the mercury level in the manometer to some predetermined setting when metering a volume of the gaseous medium into the burette. In our apparatus, as the mercury level approaches the desired setting, the incoming gasous medium is caused to be forced through the bypass, which bypass is provided with hydraulic or pneumatic resistance or impedance means to reduce the inward flow of gasous medium to a very slow rate. We have found that this bypass feature is indispensable in providing the necessary control for ease of operation in filling the gas burette prior to injecting the gaseous medium to be metered and subsequently dispensed into a closed system. Furthermore, several new and advantageous features over conventional prior-art methods for metering and dispensing predetermined and relatively small quantities of gaseous medium into laboratory-size systems are realized by the present invention.

Among these advantageous features are the simplicity of the apparatus required, the ease of operation of the method, the inexpensive maintenance of the equipment we utilize and employ. Furthermore, the design of our injector apparatus, although based on a positive displacement principle, is independent of the volumetric rate of gas flow and the injection apparatus of our invention is constructed such that a vacuum system can be operated therewith independent of the rest of the components. A still further advantage of our method is found in the relative ease in standardizing the apparatus employed and the ease of interchangeability of gas burettes of the same length but with varying inside diameters for providing for the injection of different quantities of gaseous medium over a broad range with a high degree of precision.

It is therefore an object of the present invention to provide a new and improved method and apparatus for rapidly metering and dispensing relatively small volumes of compressed gas samples into closed systems with a good degree of precision.

Still another object of the present invention is to provide a new and improved method and apparatus for rapidly metering and dispensing relatively small volumes of compressed gas samples or pressure solutions into closed systems with a good degree of precision, and in particular, to provide an apparatus useful in such method which is simple in design, inexpensively constructed, dependable in operation, and which provides for ease in interchangeability of metering vessels of various total delivery volumes so as to ensure the availability of a relatively broad range of gas samples without appreciably deleteriously affecting the read-out precision of our injection apparatus.

A further object of the present invention is to provide a method and apparatus of the type and nature referred to supra which provides a means for simply and easily substantially increasing the pneumatic impedance in the conduit between the supply source and the measuring or metering vessel during the terminal portion of the measuring step so as to highly dampen the pneumatic flow in said conduit and thereby effect a vernier pneumatic control in said conduit to provide an injection apparatus, the metering or measuring operation of which is characterized by both rapid and simple sample collection, together with precise control and cutoff of sample extraction.

Still further and more general objects and advantages of the present invention will appear from the more detailed description set forth below, it being understood, however, that this more detailed description is given by way of illustration and explanation only and not by way of limitation since various changes therein may be made by those skilled in the art without departing from the spirit and scope of the present invention.

In carrying out the objects of our invention in one form thereof, we utilize our method and apparatus to provide an anhydrous ammonia injector apparatus which has been used to meter and dispense predetermined quantities of gaseous ammonia into laboratory and greenhouse soil systems.

The design of our apparatus is based on a positive displacement principle in which compressed gas, such as ammonia from a supply cylinder, displaces the retaining liquid, i.e., metallic mercury contained in a gas burette. The mercury is displaced both into a reservoir by the incoming gas and also simultaneously is displaced into a manometer arm connected in parallel with the reservoir. An indispensable part of our fluid metering and dispensing apparatus is found in the gas measuring, monitoring, or metering portion of the system and has been referred to supra as a means for substantially increasing the pneumatic impedance during the terminal portion of the metering step of our method. In our apparatus, this feature is constructed of glass conduit and installed in the line between the compressed gas supply and the gas burette to facilitate bringing the mercury level in the manometer to some predetermined setting when metering a volume of gas into said burette. As the mercury level in the gas burette approaches the desired setting, the incoming gas is subjected to increased pneumatic impedance by means of its being forced through a bypass which is simply restricted in inside diameter to reduce the flow of gas to a very slow rate. Suitable valve means are arranged in the glass conduit line leading to the gas burette so as to subsequently dispense the gas sample from the burette into a closed system or reaction chamber. The gas sample subsequently can be forced from the burette into the closed system or reaction chamber in one of two ways: (1) by prior evacuation of the closed system or reaction chamber which would serve to pull the gas from the burette, or (2) by raising the mercury level in the gas burette through a simultaneous lowering of the mercury level in the mercury reservoir. Thus, the mercury reservoir and manometer provide a measure of the gauge pressure of the gas in the gas burette and, additionally, serve as a pressure source to force a gas sample out of the burette when dispensing the gas into a closed system or reaction chamber. Our apparatus, of course, may be used to meter and subsequently dispense any gas that is nonreactive with mercury.

It is possible in our apparatus to determine the exact quantity of gas that is metered and dispensed by the direct application of the ideal gas law, i.e., $PV=nRT$. However, an alternative procedure in this determination can be followed if a simple and convenient analytical procedure is available for a specific gas, such as ammonia, by dispensing different volumes of the gas into suitable reaction chambers for chemical analysis. A standard calibration curve expressing the relationship between the height of the mercury level in the gas burette and the weight of gas metered can then be established.

Our invention, together with further objects and advantages thereof, will be better understood from a consideration of the following description taken in connection with the accompanying drawings in which.

Figure 1:
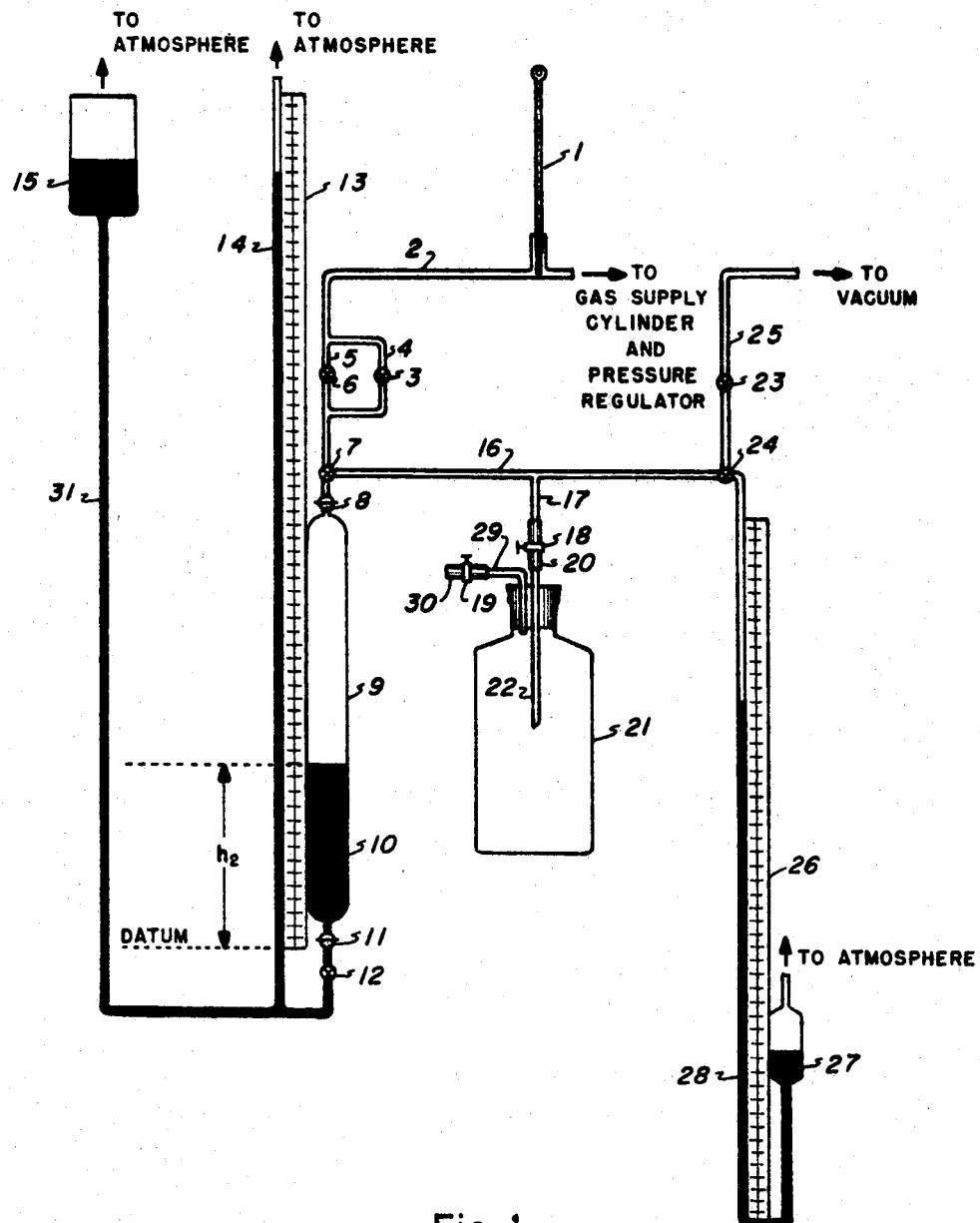
FIGURE 1 is a front elevation of our apparatus for metering and dispensing gas into a closed system in conjunction with a vacuum system which can be operated independently from the rest of the components of our injection apparatus.

Referring now more particularly to FIGURE 1, there is shown in front elevational view the apparatus of the present invention. The gas sample to be collected and subsequently metered and dispensed is withdrawn from a gas supply cylinder and through a pressure regulating means, not shown, into glass conduit 2 in which thermometer 1 is installed. With the two-way valve 3 in a closed position, the gas is forced through two-way valve 6 and through three-way valve 7, which are both open to one of the interchangeable gas burettes 9. The gas burette is initially filled with mercury up to the level of three-way valve 7. The incoming gas displaces mercury 10 from gas burette 9 into mercury reservoir 15 through flexible conduit 31.

Bypass feature 4, also referred to as means for substantially altering pneumatic impedance, consists in our apparatus of glass conduit and is installed in the line between the gas cylinder not shown and gas burette 9. Bypass feature 4 facilitates bringing the mercury level to some predetermined $h_2$ setting, as measured by meter stick 13, when metering a volume of gas into gas burette 9. As the mercury level in gas burette 9 approaches the desired $h_2$ setting, two-way valve 6 is then closed, which in effect forces the incoming gas through bypass 4 which, in one embodiment thereof, is constricted by means of two-way valve 3 to reduce the inward flow of gas to a very slow rate. Since the pressure distribution in gas burette 9 would then be nearly uniform throughout, the mercury level can be stopped at any desired $h_2$ setting by three-way valve 7 in glass conduit 5. The difference in the height of the mercury column in manometer arm 14 and the mercury level in gas burette 9, as measured by meter stick 13, is the gauge pressure of the gas which is confined in gas burette 9.

A vacuum manometer assembly which is independent of the gas metering system and consisting of meter stick 26, mercury reservoir 27, and manometer arm 28, provides for any degree of evacuation to ensure rapid transfer of the gas sample from gas burette 9 into a closed system, as indicated by reaction chamber 21. Evacuation of reaction chamber 21 is accomplished by opening pinch clamp 18 to glass conduits 17 and 16 and by opening three-way valve 24 to manometer arm 28 and to glass conduits 16 and 25. The degree of evacuation is controlled by adjustment of two way valve 23 in glass conduit 25. Conduits 16 and 17 are constructed in one embodiment of 1 millimeter diameter glass capillary so as to minimize the "dead space" volume.

The gas sample confined in gas burette 9 may be admitted into the closed system or reaction chamber 21 by closing three-way valve 24 and opening three-way valve 7 to glass conduit 16. The pressure differential between the gas confined in gas burette 9 and evacuated reaction chamber 21 causes the mercury level to rise, displacing the gas from gas burette 9 into reaction chamber 21. The mercury is allowed to displace the gas until the mercury level reaches valve 7, at which point the mercury flow from reservoir 15 is shut off by means of two-way valve 12.

FIGURE 1 also shows a closed receiving system or reaction chamber 21 fitted with gas inlet 22 and outlet connection 29 for subsequent handling of gaseous components from reaction chamber 21. After the gas sample has been dispensed into a closed receiving system or reaction chamber 21, the chamber may be sealed off by means of pinch clamps 18 and 19 on rubber tubing connections 20 and 30. A number of interchangeable gas burettes 9 of constant length and variable diameters provide for the injection of different volumes of gas with high precision. The ends of each of these interchangeable burettes are fitted with standard ground glass joints 8 and 11.

We have therefore provided a means and apparatus which is highly satisfactory for metering and dispensing a large number of gas samples rapidly and with good precision. The reproducibility or precision that may be expected in metering and dispensing different quantities of a gas such as ammonia is shown in Table I below.

TABLE I.—PRECISION AS A FUNCTION OF THE AMOUNT OF $NH_3$-N DELIVERED WITH THE FLUID METERING AND DISPENSING APPARATUS

| $NH_3$-N delivered [1] (mg.) | Reps. | Standard deviation (mg.) | Coefficient of variation (percent) | 95-percent confidence interval (mg.) |
|---|---|---|---|---|
| 2.83 | 7 | 0.071 | 2.50 | 2.75 to 2.90. |
| 11.28 | 8 | 0.050 | 0.44 | 11.24 to 11.32. |
| 38.73 | 8 | 0.037 | 0.10 | 38.70 to 38.76. |
| 164.85 | 7 | 0.165 | 0.10 | 164.70 to 165.00. |
| 288.36 | 8 | 0.133 | 0.05 | 288.25 to 288.47. |

[1] Each figure is the mean of the number of replications indicated.

Figure 2:
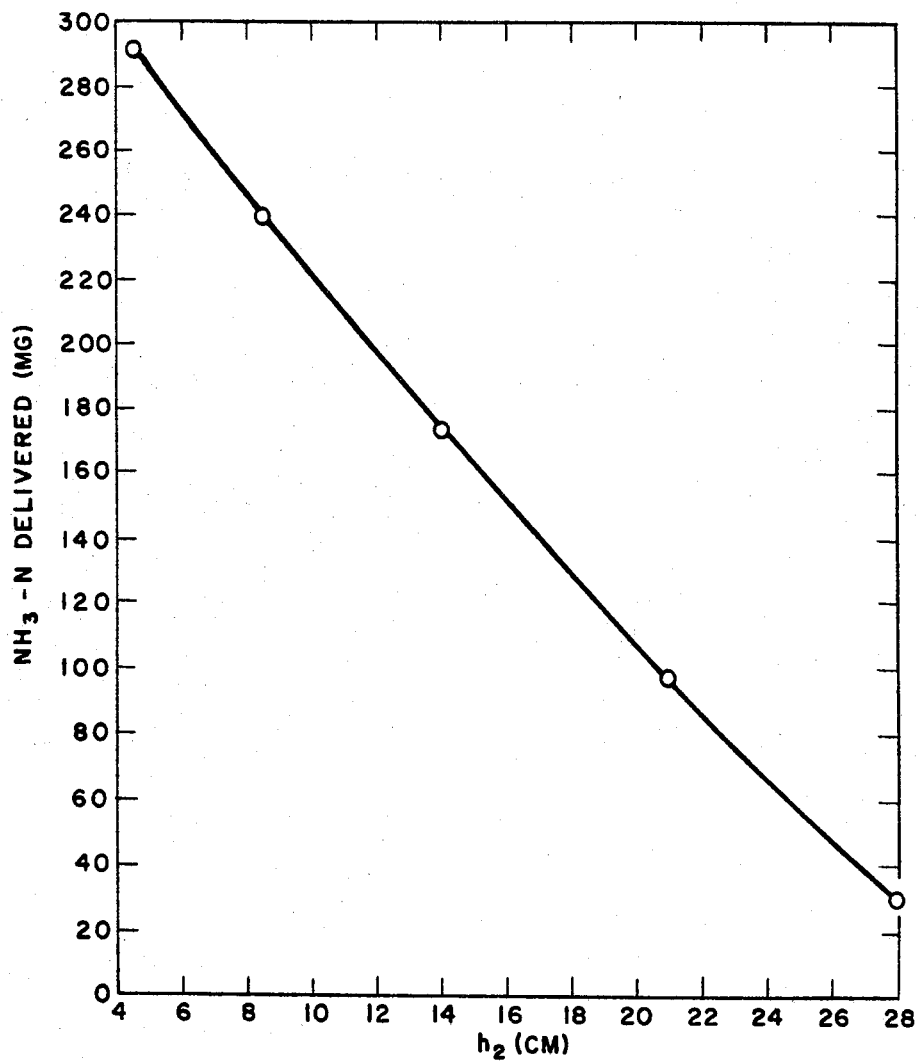
FIGURE 2 is a graphical illustration of a standard calibration curve obtained from one of the four interchangeable gas burettes which we have used in the collecting and metering phase during the operation of our apparatus.

We have referred to FIGURE 2 supra as a standard calibration curve obtained from one of our four interchangeable burettes. Such a calibration curve expressing the relationship between the height of the mercury level in the gas burette and the weight of the gas metered can be established with our apparatus in one of our alternate procedures for a specific gas such as ammonia by dispensing different volumes of the said gas in a suitable reaction chamber for chemical analysis. As a further illustration of this relationship, there is compared in Table II below the observed delivery of different quantities of gaseous ammonia with our apparatus and the corresponding values calculated by means of the ideal gas law, i.e., $PV = nRT$. It is noted that ammonia behaved as an ideal gas in our system when metered and dispensed from a supply cylinder wherein the gas pressure was about 1 atmosphere gauge.

TABLE II.—COMPARISON OF CALCULATED VS. OBSERVED AMOUNTS OF $NH_3$-N DELIVERED

| $NH_3$-N observed [1] (mg.) | $NH_3$-N calculated (mg.) | Difference (mg.) |
| --- | --- | --- |
| 291.5 | 290.7 | +0.8 |
| 240.4 | 240.1 | +0.3 |
| 174.1 | 175.0 | −0.9 |
| 97.8 | 99.2 | −1.4 |
| 38.7 | 39.8 | −1.1 |
| 11.3 | 11.3 | 0.0 |

[1] Each figure is a single delivery of gaseous $NH_3$.

The aforementioned standard calibration curve was obtained from the interchangeable gas burette having an inside diameter of 36 millimeters and a length of 40 centimeters. The other three interchangeable gas burettes are all of the same length and have inside diameters of 3.5, 13, and 25 millimeters, respectively.

We standardized our apparatus (the calibration curve therefrom) by randomly selecting a series of $h_2$ settings and injecting the corresponding volumes of gaseous ammonia directly into closed sample bottles containing standard HCl followed by titration of the excess acid with NaOH using a methylene blue-methyl red-mixed indicator.

While we have shown our invention in but one form, it will be obvious to those skilled in the art that it is not so limited but is susceptible to various changes and modifications without departing from the spirit thereof and we desire, therefore, that only such limitations shall be placed thereupon as are specifically set forth in the appended claims. Also, while we have made specific reference to the metering and dispensing of gaseous ammonia, our invention, of course, is applicable to other gases or mixtures thereof so long as they are not readily chemically reactive with the metallic mercury.

What we claim as new and desire to secure by Letters Patent of the United States is:

1. Fluid conveying apparatus for metering and subsequent dispensing of compressed gas and pressure solution samples into closed receiving systems comprising:
   (1) two upright passages communicating at their lower ends, the first of said passages being in the form of a manometer arm and being open to the atmosphere at the upper end thereof; the middle portion of the second upright passage being in the form of a vertical volumetric metering vessel having disengaging means at the top and bottom terminal portions thereof for interchangeability with similar volumetric metering vessels of greater or lesser volumetric capacities, said disengaging means adapted to have negligible effect on the readout precision of said fluid-conveying apparatus;
   (2) pneumatic impedance control means communicating with the upper portion of said second upright passage and interposed between the top portion of said second upright passage and the upper most portion of said volumetric metering vessel comprising the middle portion of said second upright passage, said pneumatic impedance control consisting of a first conduit in communication with the upper portion of said second upright passage and means therein for controlling communication therethrough and a second conduit in communication with the upper portion of said second upright passage bypassing said first means for controlling communication in said first conduit, said bypass conduit having at least a portion of its inside diameter substantially smaller than the inside diameter of said first conduit of said impedance control means, and said bypass conduit having means controlling communication therethrough;
   (3) a closed receiving chamber in communication with both (a) a vacuum supply means for evacuation of said closed receiving chamber, and (b) said second upright passage and communicating with said second upright passage at a position interposed said pneumatic impedance control means and the upper most portion of said volumetric metering vessel;
   (4) a movable reservoir of liquid being flexibly connected to the lower ends of said first and second passages at one end thereof and being open to the atmosphere at the other end thereof;
   (5) supply means for compressed gases and pressure solutions to be metered and dispensed by said fluid-conveying apparatus, said supply means communicating with the upper end of said second upright passage;
   (6) means controlling communication between the lower end of said second upright passage and the volumetric metering portion thereof;
   (7) means for controlling communication between said closed receiving chamber, said pneumatic impedance control means, and said vertical volumetric metering vessel; and
   (8) said fluid-conveying apparatus having a coefficient of variation for compressed gas samples which approximate the ideal gas law and which are metered in the volumetric range from about 50 to about 800 milligrams of less than about 0.11 percent.

References Cited

UNITED STATES PATENTS

| 1,220,979 | 3/1917 | Gregory | 137—599 |
| 2,433,177 | 12/1947 | Wainio | 141—7 |
| 2,799,561 | 7/1957 | Rochon | 23—254 |

FOREIGN PATENTS

| 820,119 | 7/1937 | France. |
| 832,905 | 7/1938 | France. |
| 519,665 | 3/1931 | Germany. |

LAVERNE D. GEIGER, *Primary Examiner.*

E. EARLS, *Assistant Examiner.*